United States Patent

Seo et al.

(10) Patent No.: US 10,301,201 B2
(45) Date of Patent: May 28, 2019

(54) COMPOSITE ELECTRODE FOR DESALINATION COMPRISING ION-EXCHANGE MEMBRANE, MANUFACTURING METHOD THEREOF, AND DESALINATION APPARATUS USING SAME

(71) Applicant: AMOGREENTECH CO., LTD., Gimpo-si (KR)

(72) Inventors: In Yong Seo, Seoul (KR); Jun Sik Hwang, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 59 days.

(21) Appl. No.: 15/084,988

(22) Filed: Mar. 30, 2016

(65) Prior Publication Data

US 2016/0207800 A1 Jul. 21, 2016

Related U.S. Application Data

(63) Continuation-in-part of application No. PCT/KR2014/009984, filed on Oct. 23, 2014.

(30) Foreign Application Priority Data

Oct. 23, 2013 (KR) .................. 10-2013-0126527
Nov. 5, 2013 (KR) .................. 10-2013-0133685

(51) Int. Cl.
*C02F 1/469* (2006.01)
*C02F 1/461* (2006.01)
(Continued)

(52) U.S. Cl.
CPC ............ *C02F 1/4695* (2013.01); *B01D 69/02* (2013.01); *B01D 69/10* (2013.01); *C02F 1/4691* (2013.01);
(Continued)

(58) Field of Classification Search
CPC .................................................. C02F 1/4691
See application file for complete search history.

(56) References Cited

U.S. PATENT DOCUMENTS 4,251,333 A * 2/1981 Suhara ................. C08J 5/2293
205/517
5,993,996 A * 11/1999 Firsich ............... C04B 38/0022
429/231.8
(Continued)

FOREIGN PATENT DOCUMENTS

JP      2010513018    4/2010
KR      20030071229   9/2003
(Continued)

OTHER PUBLICATIONS

International Search Report—PCT/KR2014/009984 dated Feb. 25, 2015.

*Primary Examiner* — Salil Jain
(74) *Attorney, Agent, or Firm* — Cantor Colburn LLP

(57) ABSTRACT

Provided are a deionization composite electrode, a method of manufacturing the deionization composite electrode, and a deionization apparatus using the same. The deionization composite electrode includes: a porous substrate having fine pores; an ion exchange membrane that is formed by electrospraying an ion exchange solution on one surface of the porous substrate; and a conductive film that is formed on the other surface of the porous substrate.

12 Claims, 8 Drawing Sheets

(51) Int. Cl.
*B01D 69/02* (2006.01)
*B01D 69/10* (2006.01)
*C02F 103/08* (2006.01)

(52) U.S. Cl.
CPC .... *C02F 1/46114* (2013.01); *B01D 2313/345* (2013.01); *B01D 2323/26* (2013.01); *B01D 2325/42* (2013.01); *C02F 2001/46138* (2013.01); *C02F 2001/46161* (2013.01); *C02F 2001/46171* (2013.01); *C02F 2103/08* (2013.01); *C02F 2201/46* (2013.01)

(56) References Cited

U.S. PATENT DOCUMENTS

| | | | | |
|---|---|---|---|---|
| 2008/0251971 | A1* | 10/2008 | Kim | B82Y 30/00 |
| | | | | 264/465 |
| 2012/0037511 | A1* | 2/2012 | Xiong | C02F 1/4604 |
| | | | | 205/746 |
| 2013/0153426 | A1* | 6/2013 | Sun | C02F 1/4691 |
| | | | | 204/638 |
| 2015/0228950 | A1* | 8/2015 | Moon | H01M 8/20 |
| | | | | 429/105 |

FOREIGN PATENT DOCUMENTS

| | | | | |
|---|---|---|---|---|
| KR | 20050056892 | | 6/2005 | |
| KR | 100501417 | | 7/2005 | |
| KR | 20060116189 | | 11/2006 | |
| KR | 100869941 | | 11/2008 | |
| KR | 20110034006 | | 4/2011 | |
| KR | 10-2011-0138862 | * | 12/2011 | ............ Y02E 60/13 |
| KR | 20110138862 | | 12/2011 | |
| KR | 10-2013-0068950 | * | 6/2013 | ............... B05D 1/06 |
| KR | 20130068950 | | 6/2013 | |
| KR | 101284009 | | 7/2013 | |
| WO | WO-2012058425 A2 | * | 5/2012 | ......... H01M 8/1004 |

\* cited by examiner

COMPOSITE ELECTRODE FOR DESALINATION COMPRISING ION-EXCHANGE MEMBRANE, MANUFACTURING METHOD THEREOF, AND DESALINATION APPARATUS USING SAME

TECHNICAL FIELD

The present invention relates to a deionization composite electrode, and more specifically, to a deionization composite electrode having an ion-exchange membrane capable of providing a high capacitance with an ultra-thin film structure, a method of manufacturing the deionization composite electrode, and a deionization apparatus using the same.

BACKGROUND ART

In general, only 0.0086% of all the earth's water volume may be used. When considering disasters due to climate change in mind, water may not be available enough.

Water is very important to human life and is used variously as water for living or industrial water. Water may be contaminated with heavy metals, nitrate, fluoride, etc., due to industrial development and it is very harmful to health to drink contaminated water.

Recently, deionization technologies for purifying contaminated water and sea water for use as agricultural, industrial, or irrigation water have been variously studied.

These deionization technologies are techniques for deionization or deionization of water by removing various suspended solids or ion components contained in the sea water or polluted water such as waste water, and may employ an evaporation method to evaporate water by using a heat source such as fossil fuels or electric power, a filtration method to filter and remove foreign materials by using a separation membrane, or an electrodialysis method to remove ions by using an electrolytic action of an electrode cell.

The evaporation method evaporates moisture by using fossil fuels or electricity as a heat source, is inefficient due to the large volume of the deionization equipment, increases the manufacturing cost due to an increase in the consumption of energy, and causes contamination of air due to the use of fossil fuels.

The filtration method removes foreign matters by applying a high pressure to a separator and thus the cost of energy increases.

The electrodialysis method has to constantly replace an electrode cell with another, and does not only generate a waste factor due to the replacement of the electrode cell but also has the disadvantage of increasing human and material incidental expenses in accordance with the replacement of the electrode cell.

Korean Patent Registration Publication No. 501417 discloses a waste water deionization apparatus using a reverse osmosis membrane method/electrode method, the waste water deionization apparatus comprising: a reverse osmosis membrane device to primarily remove salt components from water to be treated in which the water to be treated is introduced with a predetermined pressure into the reverse osmosis membrane device; a deionization electrode device that secondarily removes salt components from the water that has been primarily processed in the reverse osmosis membrane device in which a spacer, a positive electrode and a negative electrode are sequentially provided in a cylindrical tank; an energy recovery device for utilizing a brine-side pressure of the reverse osmosis membrane device for use to pressurize inlet water of the deionization electrode device; a power supply device for supplying power to the positive electrode and the negative electrode provided in the deionization electrode device; and a controller for controlling valves provided in pipes through which the water to be process in order to perform a deionization process for deionizing the water to be treated in which the water to be treated is introduced into the deionization electrode device, and a reproduction process for desorbing ions adsorbed to the electrode during the deionization process. However, such a waste water deionization apparatus includes the reverse osmosis membrane device and the deionization electrode device individually and thus may cause the large size of the deionization apparatus and require a lot of manufacturing cost.

Thus, the present inventors have consistently proceeded a study on a technique of slimming a deionization apparatus and reducing a production cost, to thus invent and derive structural features of a current collector module capable of implementing an ultra-thin film type current collector simultaneously having a high storage capacitance, to thereby have completed the present invention that is more economical, and possibly utilizable, and competitive.

SUMMARY OF THE INVENTION

To solve the above problems or defects, it is an object of the present invention to provide a deionization composite electrode having an ion exchange membrane capable of achieving a high storage capacity in an ultra-thin film structure, a method of manufacturing the deionization composite electrode, and a deionization apparatus using the same.

It is another object of the present invention to provide a deionization composite electrode having an ion exchange membrane capable of reducing a manufacturing cost, having a high storage capacity, and obtaining a very high specific surface area, by employing a current collector that is formed by penetrating a conductive material into fine pores of a porous substrate, a method of manufacturing the deionization composite electrode, and a deionization apparatus using the same.

It is still another object of the present invention to provide a deionization composite electrode having an ion exchange membrane, a method of manufacturing the same, and a deionization apparatus using the same, in which an electrode and a current collector are integrated to then be ultra-thinned to thereby slim the deionization apparatus.

It is still another object of the present invention to provide a deionization flexible composite electrode having an ion exchange membrane that may implement a flexible deionization module, a method of manufacturing the same, and a deionization apparatus using the same.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided a deionization composite electrode comprising: a porous substrate having fine pores; an ion exchange membrane that is formed by electrospraying an ion exchange solution on one surface of the porous substrate; and conductive films that are formed on all surfaces of the porous substrate.

In the deionization composite electrode according to some embodiments of the present invention, the porous substrate may be a porous ion exchange substrate having fine pores in which nanofibers that are obtained by electrospinning an ion exchange solution may be laminated and a nonwoven fabric may be laminated on the porous ion exchange substrate.

In addition, to accomplish the above and other objects of the present invention, according to another aspect of the present invention, there is provided a method of manufacturing a deionization composite electrode, the method comprising the steps of: preparing a porous substrate having fine pores; forming an ion exchange membrane by accumulating sprayed droplets that are formed by electrospraying an ion exchange solution on one surface of the porous substrate; and depositing a conductive material on the other surface of the porous substrate to thus form a conductive film.

Furthermore, to accomplish the above and other objects of the present invention, according to still another aspect of the present invention, there is provided a deionization apparatus comprising: a first deionization composite electrode including a first porous substrate having fine pores, a first ion exchange membrane that is formed on one surface of the first porous substrate, and a conductive film that is formed on the other surface of the first porous substrate; and a second deionization composite electrode including a second porous substrate having fine pores, a second ion exchange membrane that is formed on one surface of the second porous substrate, and a second conductive film that is formed on the other surface of the second porous substrate in which the second deionization composite electrode faces spaced by a gap from the first deionization composite electrode.

As described above, a deionization composite electrode according to the present invention is implemented into an ultra-thin film structure to thereby have a high storage capacity at a low cost, and is also implemented to have an electrode structure in which a conductive material is penetrated into fine pores of a porous substrate, to thereby provide an effect capable of manufacturing an electrode having a very high specific surface area and an ultra-thin film.

In addition, the present invention has an advantage capable of implementing a deionization flexible composite electrode by employing a nanofiber web or nonwoven fabric having an excellent flexibility as an electrode support.

In addition, the present invention provides a technology capable of producing a deionization composite electrode, which may easily control pore size of an electrode support and implement an electrode having pores of uniform size, to thereby improve efficiency of adsorption and desorption of ions, and which does not use a binder to thus avoid the binder from being dissolved and eluted and reduce a production cost with a simple production process.

In addition, the present invention has an advantage capable of implementing a deionization composite electrode by manufacturing an electrode by penetrating a conductive material into fine pores of a porous substrate, to thus reduce a production cost and have a high storage capacity at a lower cost.

In addition, the present invention may implement an ultra-thin film type deionization apparatus by implementing an ultra-thin film type deionization composite electrode in which a conductive film is formed on a porous substrate having fine pores.

In addition, the present invention is implemented to form an ion exchange membrane by electrospraying an ion exchange solution and accumulating sprayed liquid droplets, thus implementing non-pore film forms of a dense structure and having a thickness of an ultra-thin film type, to thereby have some advantages that only selected ions may freely move and a resistance to movement of ions may be reduced.

DETAILED DESCRIPTION OF THE INVENTION

Figure 1:
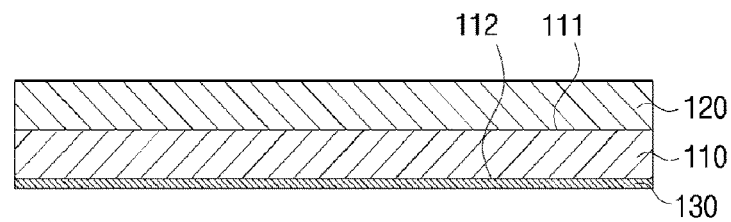
FIG. 1 is a schematic cross-sectional view illustrating a deionization composite electrode having an ion exchange membrane according to a first embodiment of the present invention.

Hereinafter, embodiments of the present invention will be described in detail with reference to the accompanying drawings. In the process, the size and shape of the components illustrated in the drawings may be exaggerated for convenience and clarity of explanation. Further, by considering the configuration and operation of the present invention, the specifically defined terms can be changed according to user's or operator's intention, or the custom. Definitions of these terms herein need to be made based on the contents across the whole application.

Referring to FIG. 1, a deionization composite electrode according to a first embodiment of the present invention includes: a porous substrate 110 having fine pores; an ion exchange membrane 120 that is formed by electrospraying an ion exchange solution on one surface 111 of the porous substrate 110; and a conductive film 130 that is formed on the other surface 112 of the porous substrate 110.

Here, a conductive film (not shown) may be further formed on one surface 111 of the porous substrate 110. In this case, the ion exchange membrane 120 may be formed on the conductive film (not shown) formed on one surface 111 of the porous substrate 110, and its structure is not shown in the drawings.

In the case that the conductive film 130 is formed on only the other surface 112 of the porous substrate 110, in the deionization composite electrode structure according to the first embodiment of the present invention, the ion exchange membrane 120 is formed by directly electrospraying the ion exchange solution on one surface 111 of the porous member 110 in which the conductive film 130 is not formed on the one surface 111 of the porous member 110. In addition, when the conductive films 130 are respectively formed on both surfaces of the porous member 110, the ion exchange membrane 120 is formed by electrospraying the ion exchange solution on the conductive film (not shown) formed on one surface 111 of the porous member 110.

The ion exchange membrane 120 may be a positive ion exchange membrane or a negative ion exchange membrane according to the polarity of the electrode, and the ion exchange membrane 120 serves to selectively adsorb ions to the electrode. That is, the negative ion exchange membrane is coupled to a positive electrode, and the positive ion exchange membrane is coupled to a negative electrode. Thus, when a voltage is applied across the positive electrode and the negative electrode, only the positive ions are adsorbed to the negative electrode, and only the negative ions are adsorbed to the positive electrode.

Then, when the ion exchange solution is electrosprayed, fine-sized liquid droplets are sprayed from the electrospraying nozzle, and are more finely differentiated by an electric force to then be accumulated to thereby form the ion exchange membrane 120 in a non-pore film form.

The ion exchange membrane 120 may have a form having pores or a non-pore form. For example, when the ion exchange membrane 120 has a non-pore form, selective permeability of ions may be increased. Meanwhile, the ion exchange membrane 120 having pores may allow all positive and negative ions to pass through the pores in spite of electrical attraction or repulsion, and thus does not provide a preferred structure.

In this way, the present invention is implemented to form the ion exchange membrane by electrospraying the ion exchange solution and accumulating sprayed liquid droplets, thus implementing non-pore film forms of a dense structure and having a thickness of an ultra-thin film type, to thereby have some advantages that only selected ions may freely move and a resistance to movement of ions may be reduced.

The conductive film 130 may be formed by depositing a conductive material on at least the other surface 112 of the porous substrate 110. Here, the conductive material may be at least one metal such as nickel (Ni), copper (Cu), stainless steel (SUS), titanium (Ti), chromium (Cr), manganese (Mn), iron (Fe), cobalt (Co), zinc (Zn), molybdenum (Mo), tungsten (W), silver (Ag), gold (Au), and aluminum (Al). Preferably, a deposition film may be formed by depositing copper. Here, the conductive material may be deposited on only the other surface 112 of the porous substrate 110, preferably, the conductive materials may be deposited on the whole surfaces of the porous substrate 110 including one surface 111 and the other surface 112 of the porous substrate 100.

The porous substrate 110 may be formed by a nanofiber web, a nonwoven fabric or a lamination structure of the nanofiber web and the nonwoven fabric, in which the nanofiber web is formed by laminating nanofibers obtained by electrospinning a polymer material and includes fine pores. The lamination structure of the nanofiber web and the nonwoven fabric may be a structure that the nanofiber web is laminated on one surface of the nonwoven fabric, or a structure that the nanofiber webs are laminated on both surfaces of the nonwoven fabric. Here, when a deionization composite electrode is implemented by employing the lamination structure of the nanofiber web and the nonwoven fabric, an electrode having a high specific surface area may be produced.

That is, the porous substrate 110 may be applied as the lamination structure of the nanofiber web and the nonwoven fabric, or the lamination structure of the nanofiber web/the nonwoven fabric/the nanofiber web. In this case, thickness of the nanofiber web is preferably thinner than that of the nonwoven fabric. Here, the nanofiber web and the nonwoven fabric may be laminated through a lamination process.

Thus, when the deionization composite electrode is formed by employing the lamination structure of the nanofiber web and the nonwoven fabric, the nonwoven fabric is more inexpensive than the nanofiber web, and the former has the higher strength than the latter, to thereby reduce the production cost of the deionization composite electrode and simultaneously improve the strength. In addition, since the nonwoven fabric also includes a large number of pores, a conductive material for deposition may be penetrated into the nonwoven fabric.

The porous substrate 110 is provided with fine pores. Accordingly, when the conductive material is deposited on the porous substrate 110 having fine pores, the deposited conductive material is penetrated into the fine pores, and thus deposition films are formed inside the fine pores, and the pores of the porous substrate 110 after deposition become finer than those of the porous substrate 110 before deposition. Thus, the deionization composite electrode according to the embodiment of the present invention has an electrode structure having fine pores capable of adsorbing ions, which will be used as a capacitive deionization electrode.

Figure 2:
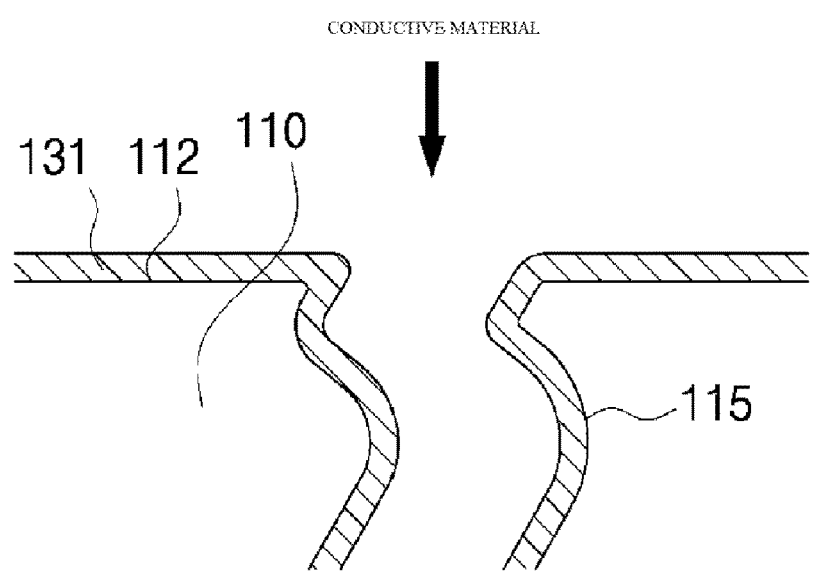
FIG. 2 is a conceptual view for explaining that a deposition material is penetrated into fine pores of a porous substrate of the deionization composite electrode having an ion exchange membrane that is applied to the first embodiment of the present invention.

That is, as shown in FIG. 2, a conductive material 131 is deposited on the other side 112 or the entire surface of the porous substrate 110 is penetrated into the fine pores 115, to thus form a porous electrode.

Figure 3:
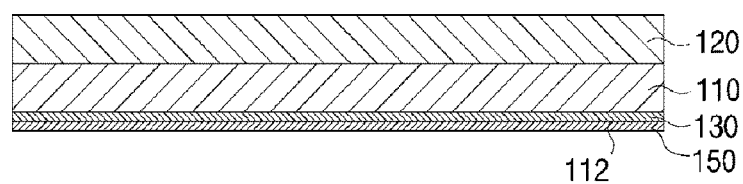
FIG. 3 is a schematic cross-sectional view illustrating a coat layer is formed on the deionization composite electrode having an ion exchange membrane according to the first embodiment of the present invention.

Referring to FIG. 3, a deionization composite electrode according to the first embodiment of the present invention further includes a coat layer 150 coated on the conductive film 130 formed on the porous substrate 110, in which the coat layer 150 serves to act as a current collector.

The coat layer 150 plays a role of improving the electrical conductivity of the deionization composite electrode, and does not require a separate current collector. Accordingly, the deionization composite electrode may be ultra-thinned and slimmed, to thereby reduce the size of a deionization apparatus. Here, the coat layer 150 is coated on the conductive film 130 formed on the porous substrate 110 and is formed on only one surface of the porous member 110. That is, since the deionization composite electrode applied to some embodiments of the present invention plays a role of an electrode and a current collector simultaneously as a sheet, and does not have a sufficient electrical conductivity for the deionization composite electrode with the conductive film 130 that is formed by depositing the conductive material, the coat layer 150 is required.

Then, the reason for forming the coat layer 150 on only one surface of the porous substrate 110 is that pores are usually blocked when plating, and thus an electrode portion of the deionization composite electrode should be porous. However, the coat layer 150 is not formed in the electrode portion.

Thus, the deionization composite electrode according to the first embodiment of the present invention is implemented as an electrode structure in which the conductive material is penetrated into the fine pores of the porous substrate such as the nanofiber web, and has the advantage of producing an electrode of a very high specific surface area, and an ultra-thin film electrode having a thickness of 1 μm to 50 μm.

In addition, the present invention has an advantage capable of implementing a deionization flexible composite electrode by employing a nanofiber web or nonwoven fabric having an excellent flexibility as an electrode support, and mounting the deionization composite electrode even in a deionization apparatus of a curved intrinsic shape.

Further, the present invention may implement an electrode which may easily control pore size and have pores of uniform size, to thereby improve efficiency of adsorption and desorption of ions.

Moreover, the present invention provides an electrode which does not use a binder to thus avoid the binder from being dissolved and eluted and may reduce a production cost with a simple production process.

In addition, the present invention has an advantage capable of implementing a deionization composite electrode by manufacturing an electrode by penetrating a conductive material into fine pores of a porous substrate, to thus reduce a production cost and have a high storage capacity at a lower cost.

Figure 4:
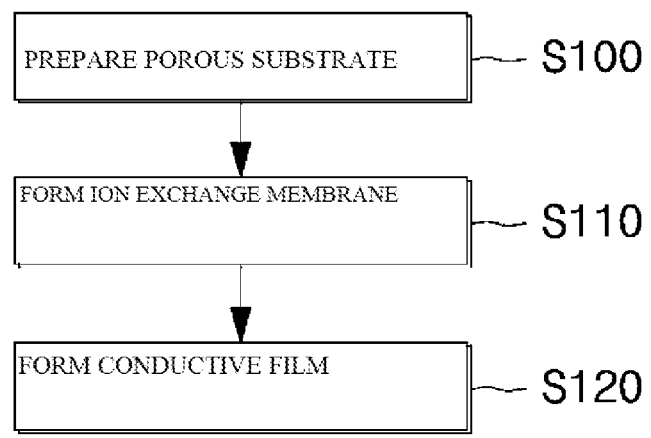
FIG. 4 is a flowchart of a method of manufacturing a deionization composite electrode according to the first embodiment of the present invention.
Figure 5A:
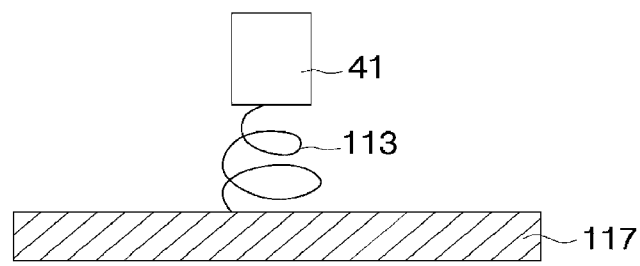
FIGS. 5A and 5B are schematic cross-sectional views for explaining a process of forming a porous substrate and an ion exchange membrane in the method of manufacturing a deionization composite electrode according to the first embodiment of the present invention.
Figure 5B:
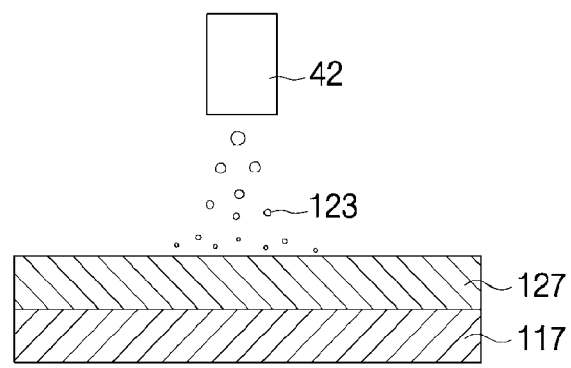
Figure 6:
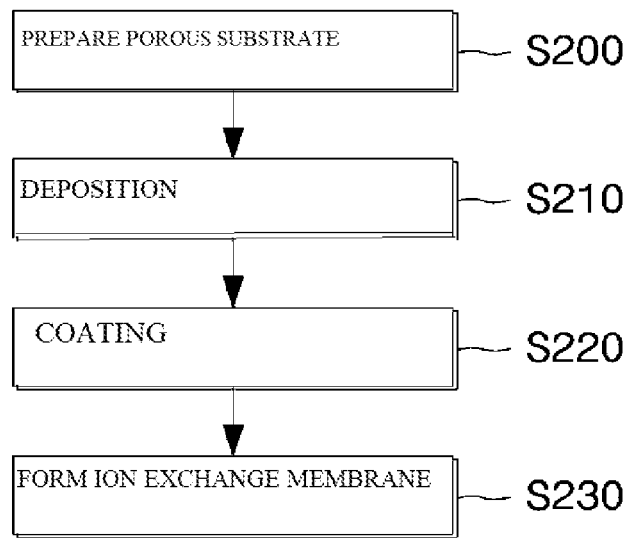
FIG. 6 is a flowchart of a modification of the method of manufacturing a deionization composite electrode according to the first embodiment of the present invention.

FIG. 4 is a flowchart of a method of manufacturing a deionization composite electrode according to the first embodiment of the present invention. FIGS. 5A and 5B are schematic cross-sectional views for explaining a process of forming a porous substrate and an ion exchange membrane in the method of manufacturing a deionization composite electrode according to the first embodiment of the present invention. FIG. 6 is a flowchart of a modification of the method of manufacturing a deionization composite electrode according to the first embodiment of the present invention.

Referring to FIG. 4, the method of manufacturing a deionization composite electrode in accordance with the first embodiment of the present invention includes preparing a porous substrate made of a nanofiber web, a nonwoven fabric or a lamination structure of the nanofiber web and the nonwoven fabric, in which the nanofiber web is formed by accumulating nanofibers obtained by electrospinning a polymer material and includes fine pores (S100).

The porous nanofiber web may be obtained by electrospinning a mixed spinning solution that is formed by dissolving a single kind of a polymer or a mixture of at least two kinds of polymers in a solvent, or may be obtained by dissolving respectively different polymers in a solvent and then cross-spinning the electrospun spinning solution through respectively different spinning nozzles.

When forming a mixed spinning solution by using two types of polymers, for example, in the case of mixing polyacrylonitrile (PAN) as a heat-resistant polymer and polyvinylidene fluoride (PVDF) as an adhesive polymer, it is preferable to mix both in a range of 8:2 to 5:5 at a weight ratio.

In the case that a mixing ratio of the heat-resistant polymer and the adhesive polymer is less than 5:5 at a weight ratio, heat resistance performance of the mixed spinning solution falls to thus fail to exhibit required high temperature properties. On the contrary, in the case that a mixing ratio of the heat-resistant polymer and the adhesive polymer is larger than 8:2 at a weight ratio, the intensity of the mixed spinning solution falls to thereby cause a spinning trouble to occur.

In some embodiments of the present invention, considering that the solvent volatilization may not be well achieved depending on the type of the polymer when using a single solvent, it may be designed to pass through a pre-air dry zone by a pre-heater after a spinning process, and to undergo a process of adjusting the amount of the solvent and moisture remaining on the surface of the porous nanofiber web, as will be described later.

Any polymers may be used in the case of fiber forming polymers that may be dissolved in a solvent to thus form a spinning solution, and then may be spun in an electrospinning method to thus form nanofibers.

The heat-resistant polymer resin that may be used in the present invention is a resin that may be dissolved in an organic solvent for electrospinning and whose melting point is 180° C. or higher, for example, any one selected from the group consisting of: aromatic polyester such as polyacrylonitrile (PAN), polyamide, polyimide, polyamide-imide, poly meta-phenylene iso-phthalamide, polysulfone, polyether ketone, polyethylene terephthalate, polytrimethylene terephthalate, and polyethylene naphthalate; polyphosphazenes such as polytetrafluoroethylene, polydiphenoxy phosphazene, and poly {bis [2-(2-methoxyethoxy) phosphazene]}; polyurethane copolymer containing at least one of polyurethane and polyether urethane; cellulose acetate; cellulose acetate butylrate; and cellulose acetate propionate.

The porous nanofiber web is made of ultra-fine nanofibers that are formed by dissolving a single or mixed polymer in a solvent to thus form a spinning solution, and spinning the spinning solution, and then is calendered at a temperature below or equal to a melting point of the polymer thereby adjusting sizes of the pores and thickness of the web.

The porous nanofiber web is formed of, for example, nanofibers to have a diameter of 50 nm to 1500 nm, and are set to 1 μm to 100 μm thick, preferably set to 10 μm to 30 μm in thickness. The sizes of the fine pores are set to 0.1 μm to 10 μm, and the porosity is set to 50% to 90%.

In this case, the porous substrate may be formed of a porous nonwoven fabric alone or may be formed by laminating the porous nanofiber web and a porous nonwoven fabric, if necessary, in order to reinforce the strength of the support. The porous nonwoven fabric may employ any one of a nonwoven fabric made of PP/PE fibers of a double structure in which polyethylene (PE) is coated on the outer periphery of polypropylene (PP) fibers, as a core, a polyethylene terephthalate (PET) nonwoven fabric made of PET fibers, and a nonwoven fabric made of cellulose fibers.

Then, an ion exchange membrane is formed (S110) in which the ion exchange membrane is formed by electrospraying an ion exchange solution on one surface of the porous substrate and accumulating sprayed liquid droplets, and a conductive film is formed by depositing a conductive material on the other surface of the porous substrate (S120).

In this way, an ultra-thin deionization composite electrode is prepared. When implementing a porous substrate with a nanofiber web, as shown in FIG. 5A, a spinning solution is electrospun through a first nozzle 41 that the spinning solution is formed by dissolving a polymer material in a solvent to thus form and accumulate nanofibers 113 to thereby form the nanofiber web 117. Then, as shown in FIG. 5B, the ion exchange membrane 127 is formed by electrospraying an ion exchange solution on one surface of the nanofiber web 117 through a second nozzle 42 and thus accumulating the sprayed liquid droplets 123.

Meanwhile, the conductive film may be formed by using a deposition process using a CVD (Chemical Vapor Deposition) method or a PVD (Physical Vapor Deposition) method, depending on a material of the conductive material.

Referring to FIG. 6, a modification of the method of manufacturing a deionization composite electrode according to the first embodiment of the present invention, includes preparing a porous substrate made of a nanofiber web, a nonwoven fabric or a lamination structure of the nanofiber web and the nonwoven fabric, in which the nanofiber web is formed by accumulating nanofibers obtained by electrospinning a polymer material and includes fine pores (S200), and forming a conductive film by depositing a conductive material on the other surface of the porous substrate or depositing conductive materials on both surfaces of the porous substrate (S210).

Then, a metal material is coated on the conductive film formed on the other surface of the porous substrate to form a coat layer (S220), and an ion exchange solution is coated on one surface of the porous substrate to thus form an ion exchange membrane (S230).

Figure 7:
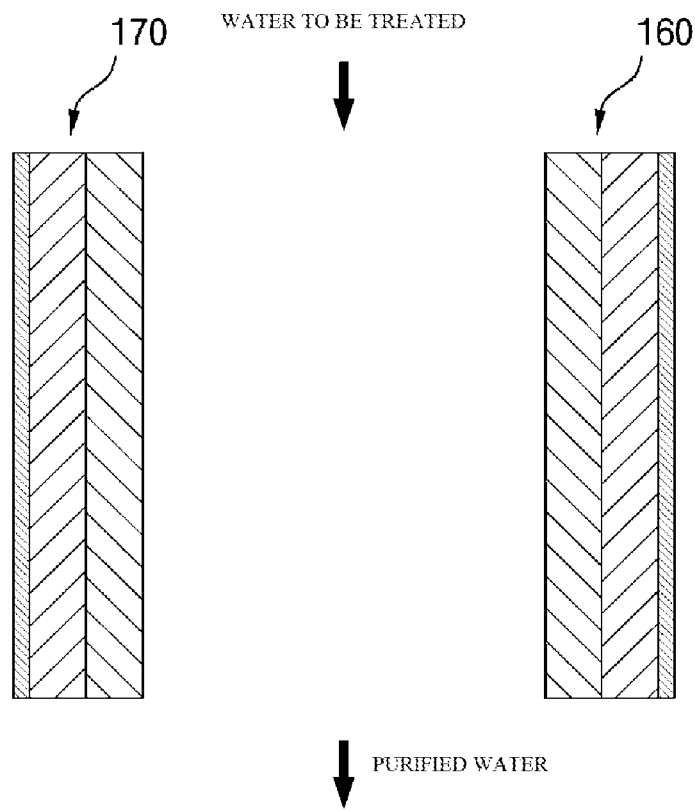
FIG. 7 is a conceptual view for explaining a deionization apparatus according to the first embodiment of the present invention.
Figure 8:
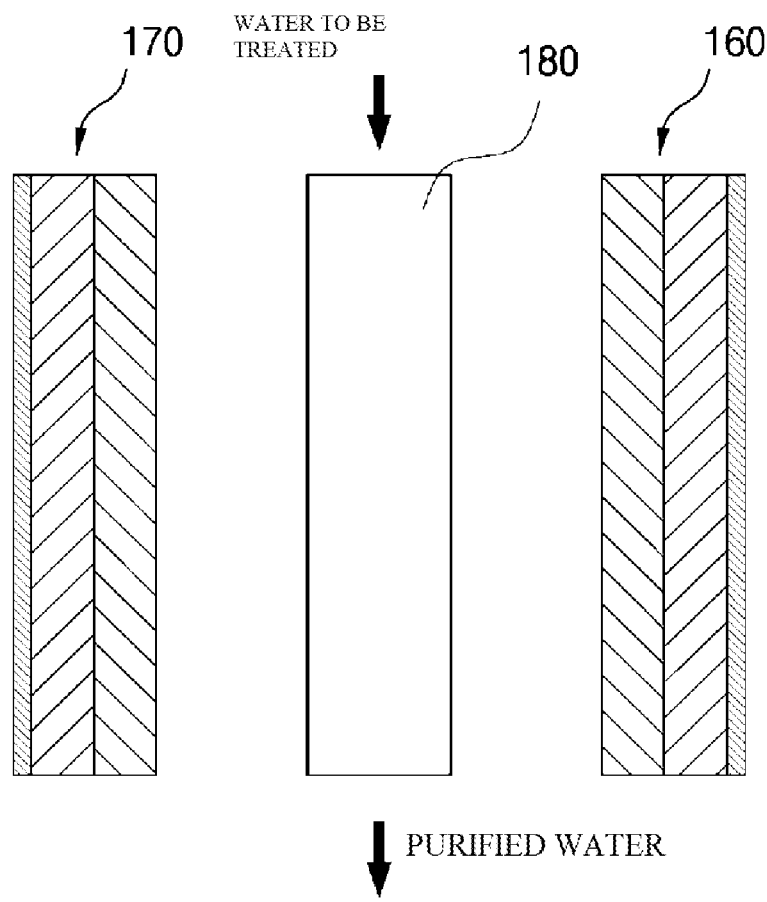
FIG. 8 is a conceptual view for explaining a deionization apparatus according to a second embodiment of the present invention.

FIG. 7 is a conceptual view for explaining a deionization apparatus according to the first embodiment of the present invention, and FIG. 8 is a conceptual view for explaining a deionization apparatus according to a second embodiment of the present invention.

The deionization composite electrodes that are manufactured by using the respective methods of manufacturing a deionization composite electrode of FIGS. 4 and 6, and the deionization apparatuses of FIGS. 7 and 8 may be implemented by using the deionization composite electrodes according to the first and second embodiments of the present invention.

Referring to FIGS. 5A and 5B, the deionization apparatus according to the first embodiment of the present invention includes: a first deionization composite electrode 160 including a first porous substrate having fine pores, a first ion exchange membrane that is formed on one surface of the first porous substrate, and a conductive film that is formed on the other surface of the first porous substrate; and a second deionization composite electrode 170 including a second porous substrate having fine pores, a second ion exchange membrane that is formed on one surface of the second porous substrate, and a second conductive film that is formed on the other surface of the second porous substrate in which the second deionization composite electrode 170 faces spaced by a gap from the first deionization composite electrode 160.

The first and second deionization composite electrodes 160 and 170 are current collectors having respectively different polarities or potentials. For example, the first deionization composite electrode 160 is a negative pole current collector, and the second deionization composite electrode 170 is a positive pole current collector.

When a potential is applied between the first and second deionization composite electrodes 160 and 170, ions included in water to be treated such as sea water or waste water entering one side of the deionization apparatus are adsorbed on the surfaces of the first and second deionization composite electrodes 160 and 170 and removed from the water to be treated, by electric attraction from an electric double layer formed on the surfaces of the first and second deionization composite electrodes 160 and 170, to thereby discharge purified water through the other side of the deionization apparatus. In this case, by the electric attraction, the porous electrodes adsorb ions contained in the water to be treated such as sea water or waste water.

Referring to FIG. 8, as compared with the deionization apparatus according to the first embodiment, the deionization apparatus according to the second embodiment of the present invention further includes a nonwoven fabric 180 that is positioned in a space between the first and second deionization composite electrodes 160 and 170, and through which water to be treated passes.

The deionization apparatus according to the second embodiment of the present invention adsorbs ions from water to be treated passing through the nonwoven fabric 180 at potentials applied across the first and second deionization composite electrodes 160 and 170, to thereby implement capacitive deionization.

Since a plurality of pores of irregular shapes are formed in the nonwoven fabric 180, the direction of flow of water to be treated passed between the first and second deionization composite electrodes 160 and 170 varies in various patterns, and thus adsorption efficiency of ions may be increased by a potential applied across the first and second deionization composite electrodes 160 and 170.

Therefore, the deionization apparatuses according to the first and second embodiments of the present invention may implement an ultra-thin deionization apparatus by employing an ultra-thin deionization composite electrode by forming a conductive film or conductive films on a porous substrate having fine pores.

A coat layer or coat films may be respectively further formed on a conductive film or conductive films applied to the deionization apparatuses according to the first and second embodiments of the present invention, in order to improve electrical conductivity.

Meanwhile, the deionization apparatuses according to the first and second embodiments of the present invention may be backwashed by switching the electrode potential to zero volts (V) or the inverse potential when the adsorbed ions reach the capacitance of the deionization composite electrode, thereby desorbing ions adsorbed in the deionization composite electrode to thus be recycled.

Figure 9:
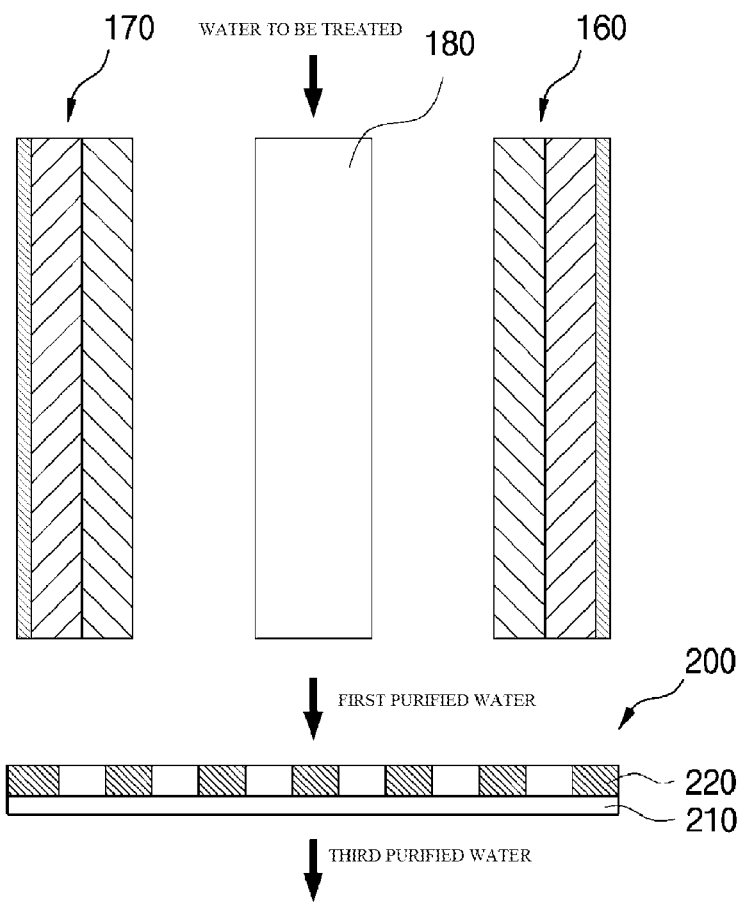
FIG. 9 is a conceptual view for explaining a deionization apparatus according to a third embodiment of the present invention.
Figure 10:
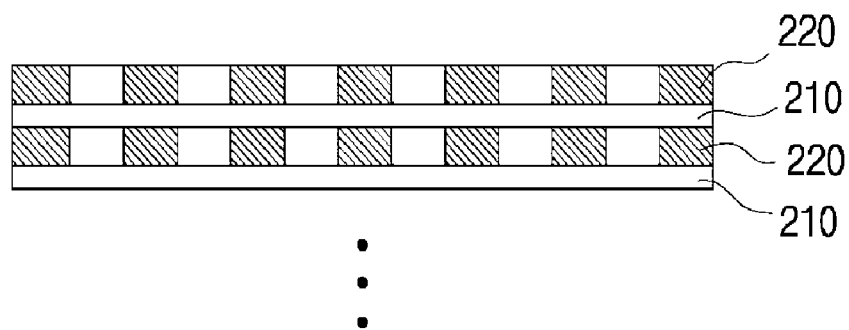
FIG. 10 is a conceptual diagram for explaining a structure that filter modules of FIG. 9 are stacked.

FIG. 9 is a conceptual view for explaining a deionization apparatus according to a third embodiment of the present invention, and FIG. 10 is a conceptual diagram for explaining a structure that filter modules of FIG. 9 are stacked.

Referring to FIG. 9, the deionization apparatus according to the third embodiment of the present invention may further include a filter module 200 to filter out heavy metal ions and bacterial substances on the other end of the deionization apparatus through which purified water is discharged.

The filter module 200 is provided at the other end of the deionization apparatus to eliminate heavy metal ions and bacterial substances such as bacteria and microorganisms.

Here, FIG. 9 is a conceptual view, in which the filter module 200 is shown as being spaced from the other end of the deionization apparatus, but is not limited thereto. However, the first and second deionization composite electrodes 160 and 170 should be constructed in a structure for preventing leakage of the first purified water that has passed through between the first and second deionization composite electrodes 160 and 170 by default. For example, the filter module 200 may be in close contact with the other end of the deionization apparatus from which the first purified water is discharged, or a guide for preventing the leakage of the first purified water may be provided between each of the first and second deionization composite electrodes 160 and 170 and the filter module 200.

The filter module 200 includes: a silver (Ag) mesh module 220 for removing heavy metal ions from first purified water that is obtained by removing ions from water to be treated by the first and second deionization composite electrodes 160 and 170; and a nanofiber web 210 that is fixed to the Ag mesh module 220, thereby filtering the bacterial substances from second purified water (not shown) from which the heavy metal ions have been removed.

Since fine pores are formed in the nanofiber web 210, the bacterial substances are captured and collected by the nanofiber web 210 while the second purified water passes through the nanofiber web 210, to thereby discharge third purified water.

In addition, as shown in FIG. 10 the filter module 200 may be implemented into a repeatedly laminated structure of the mesh module 220 and the nanofiber web 210 in which the mesh module 220 and the nanofiber web 210 are stacked repeatedly.

Thus, in some embodiments of the present invention, the deionization apparatus further includes the filter module, to thereby filter the heavy metal ions and bacterial substances.

Meanwhile, in some embodiments of the present invention, the nanofiber web 210 may be implemented in a nanofiber web in which the nanofibers containing silver nano-materials are laminated. In other words, purified water having passed through the nanofiber web containing silver nano-materials prevents propagation of bacteria to thus increase the antibacterial properties.

Accordingly, a silver nano-material or a polymer material is dissolved in an organic solvent, to thus prepare a spinning solution, and then the spinning solution is electrospun to thus prepare nanofibers. Then, the nanofibers are laminated to thus prepare a nanofiber web.

Figure 11:
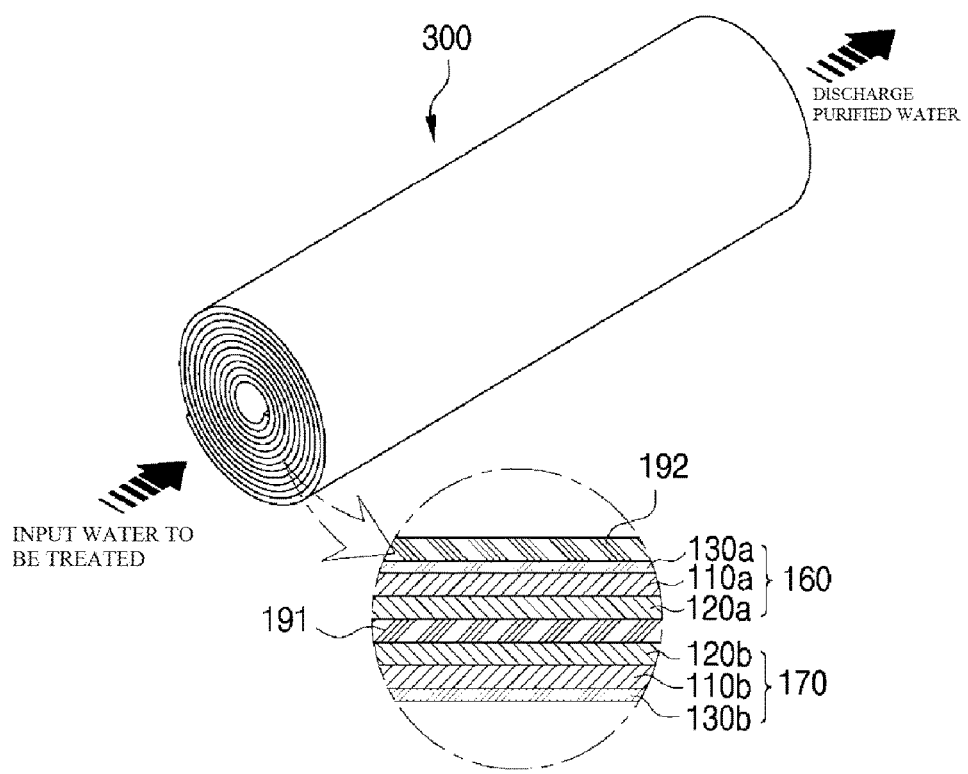
FIG. 11 is a conceptual perspective view illustrating an assembled state of a deionization apparatus according to the present invention.

FIG. 11 is a conceptual perspective view illustrating an assembled state of a deionization apparatus 300 according to the present invention.

The above-mentioned deionization composite electrode is implemented to include the nanofiber web or the nonwoven fabric having excellent flexibility as the electrode support, to thereby have very flexible characteristic to thus implement a deionization apparatus 300 in a variety of assembly forms.

In some embodiments according to the present invention, for example, a spacer 191 is provided between the first and second deionization composite electrodes 160 and 170, in which a flow path through which water to be treated can pass is formed in the spacer 191, and as shown in FIG. 11, the deionization apparatus 300 may be spirally wound and assembled. That is, the deionization apparatus is assembled in a spirally wound shape.

Ion exchange membranes 120a and 120b of the first and second deionization composite electrodes 160 and 170 are opposed to each other. Thus, when a voltage is applied across the first and second deionization composite electrodes 160 and 170, ions are adsorbed from water to be treated passing through the spacer 191, to thereby perform capacitive deionization. In this case, the deionization apparatus has an assembly structure so that water to be treated is input from one side of the deionization apparatus and deionized while flowing along the spirally wound type flow path of the spacer 191, and then the deionized and purified water is discharged toward the other side of the deionization apparatus, to thereby improve deionization efficiency. The nonwoven fabric may be applied as an example of the spacer 191.

Here, the first deionization composite electrode 160 includes a first porous substrate 110a having fine pores, a first ion exchange membrane 120a that is formed on one surface of the first porous substrate 110a, and a conductive film 130a that is formed on the other surface of the first porous substrate 110a; and the second deionization composite electrode 170 includes a second porous substrate 110b having fine pores, a second ion exchange membrane 120b that is formed on one surface of the second porous substrate 110b, and a second conductive film 130b that is formed on the other surface of the second porous substrate 110b.

In some embodiments of the present invention, it is preferable that an insulating layer 192 is laminated on one of the respective conductive films 130a and 130b of the first deionization composite electrode 160 and the second deionization composite electrode 170, or insulating layers 192 are respectively laminated on both of the respective conductive films 130a and 130b of the first deionization composite electrode 160 and the second deionization composite electrode 170.

Meanwhile, when spirally rolling a structure that the first deionization composite electrode 160, the spacer 191, and the second deionization composite electrode 170 are sequentially stacked, to implement a deionization apparatus of a spirally wound type assembly structure according to the embodiment of the present invention, the first deionization composite electrode 160, the spacer 191, and the second deionization composite electrode 170 are sequentially repeated in a direction from the center of the rolled structure (roll axis) to the outer peripheral surface. Accordingly, when a voltage is applied across the first and second deionization composite electrodes 160 and 170, electrical interference may occur between the neighboring repeating structures to thus reduce deionization characteristics.

Therefore, the deionization apparatus 300 is assembled in a spirally wound type by including the insulating layer 192 for preventing the electrical interference and effect between the spirally wound repeating structures.

Figure 12:
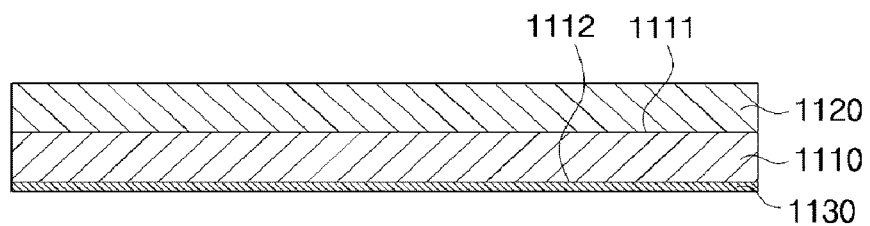
FIG. 12 is a schematic cross-sectional view illustrating a deionization composite electrode having an ion exchange membrane according to the second embodiment of the present invention.
Figure 13:
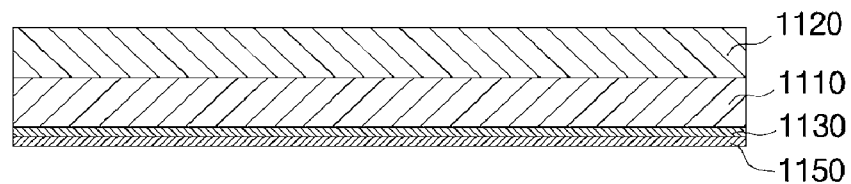
FIG. 13 is a schematic cross-sectional view illustrating a coat layer is formed on the deionization composite electrode having an ion exchange membrane according to the second embodiment of the present invention.

FIG. 12 is a schematic cross-sectional view illustrating a deionization composite electrode having an ion exchange membrane according to the second embodiment of the present invention, and FIG. 13 is a schematic cross-sectional view illustrating a coat layer is formed on the deionization composite electrode having an ion exchange membrane according to the second embodiment of the present invention.

Referring to FIG. 12, the deionization composite electrode according to the second embodiment of the present invention includes: a porous ion exchange substrate 1110 having fine pores; an ion exchange membrane 1120 that is formed by electrospraying an ion exchange solution on one surface 1111 of the porous ion exchange substrate 1110; and a conductive film 1130 that is formed on the other surface 1112 of the porous ion exchange substrate 1110.

In the case that the conductive film 1130 is formed on only the other surface 1112 of the porous ion exchange substrate 1110, in the deionization composite electrode structure according to the first embodiment of the present invention, the ion exchange membrane 1120 is formed by directly electrospraying the ion exchange solution on one surface 1111 of the porous ion exchange member 1110 in which the conductive film 1130 is not formed on the one surface 1111 of the porous ion exchange member 1110.

Figure 16:
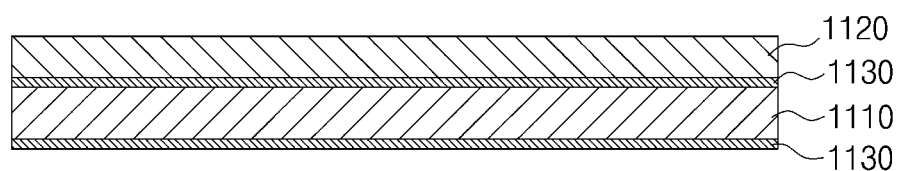
FIG. 16 is a schematic cross-sectional view illustrating a deionization composite electrode having an ion exchange membrane according to a third embodiment of the present invention.

In addition, as shown in FIG. 16, according to a third embodiment of the present invention, when the conductive films 1130 are respectively formed on both surfaces of the porous member 1110, the ion exchange membrane 1120 is formed by electrospraying the ion exchange solution on the conductive film formed on one surface 1111 of the porous ion exchange member 1110.

When electrospraying an ion-exchange solution on one surface of the porous ion exchange substrate 1110, according to some embodiments of the present invention, liquid droplets are sprayed and simultaneously the liquid droplets from which most of the solvent has been volatilized are accumulated on one surface of the porous ion exchange substrate 1110, to thus form the non-pore ion exchange membrane 1120 with no pores. As a result, a separate drying step may be unnecessary to thus maximize productivity.

The porous ion exchange substrate 1110 is a porous thin film that is made by accumulating nanofibers formed by electrospinning the ion exchange solution, to thereby produce a porous electrode made of an ion exchange material with a high specific surface area.

Then, when the ion exchange solution is electrosprayed, fine-sized liquid droplets are sprayed from the electrospraying nozzle, and are more finely differentiated by an electric force to then be accumulated to thereby form the non-pore ion exchange membrane 1120 in a non-pore film form.

Therefore, the non-pore ion exchange membrane 1120 is a non-pore thin film that is made by accumulating liquid droplets formed by electrospraying the ion exchange solution, and thus may be formed very thinly and uniformly, to thus improve the adsorption and desorption efficiency of ions.

The non-pore ion exchange membrane 1120 has an effect of preventing desorbed ions from being adsorbed to the other electrode when ions adsorbed in one electrode of the capacitive deionization apparatus are desorbed.

Referring to FIG. 13, a deionization composite electrode according to the second embodiment of the present invention further includes a coat layer 1150 coated on the conductive film 1130 formed on the porous ion exchange substrate 1110.

Figure 14:
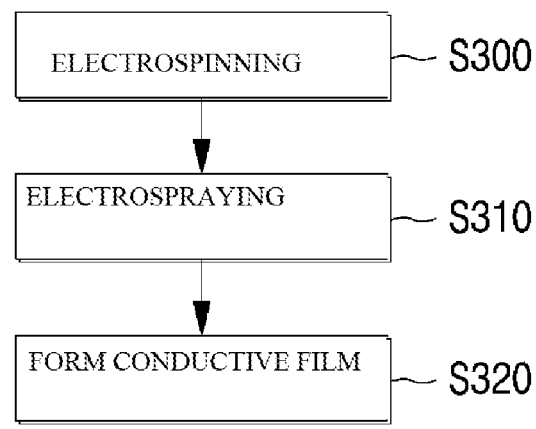
FIG. 14 is a flowchart of a method of manufacturing a deionization composite electrode having an ion exchange membrane according to the second embodiment of the present invention.
Figure 15:
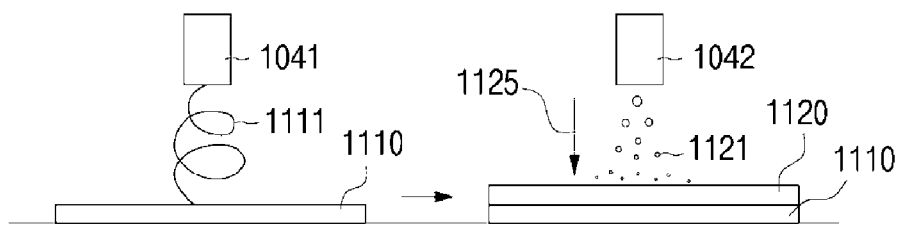
FIG. 15 is a conceptual view illustrating some processes in a method of manufacturing the deionization composite electrode having an ion exchange membrane according to the second embodiment of the present invention.

FIG. 14 is a flowchart of a method of manufacturing a deionization composite electrode having an ion exchange membrane according to the second embodiment of the present invention, and FIG. 15 is a conceptual view illustrating some processes in a method of manufacturing the deionization composite electrode having an ion exchange membrane according to the second embodiment of the present invention.

Referring to FIG. 14, a deionization composite electrode having an ion exchange membrane according to the second embodiment of the present invention includes forming a porous ion exchange substrate that is formed by accumulating nanofibers formed by electrospinning an ion exchange solution and includes fine pores (S300).

Then, the deionization composite electrode having an ion exchange membrane according to the second embodiment of the present invention includes forming an ion exchange membrane that is made by accumulating liquid droplets sprayed by electrospraying the ion exchange solution on one surface of the porous ion exchange (S310), and forming a conductive film on the other surface of the porous ion exchange substrate or conductive films on both surfaces of the porous ion exchange substrate (S320).

Referring to FIG. 15, the processes of forming the porous ion exchange substrate 1110 and the ion exchange membrane 1120 will be described first in the method of producing a deionization composite electrode having an ion exchange membrane according to the second embodiment of the present invention. First, when an ion exchange solution as a spinning solution is electrospun through a first nozzle 1041, the electrospun nanofibers 1111 are accumulated to thereby form a porous ion exchange substrate 1110. Then, the porous ion exchange substrate 1110 is moved to a lower side of a second nozzle 1042. Thereafter, when an ion exchange solution is electrosprayed to an upper side of the porous ion exchange substrate 1110 that is positioned at a lower direction 1125 of the second nozzle 1042, the sprayed liquid droplets 1121 are accumulated on the porous ion exchange substrate 1110 to then be formed into the ion exchange membrane 1120.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention provides a deionization composite electrode having a high storage capacity in a very thin structure by forming an ion exchange membrane on one surface of a porous substrate and a conductive film on the other surface of the porous substrate, to thus provide an ultra-thin deionization apparatus.

The invention claimed is:

1. A deionization composite electrode comprising:
   a porous ion exchange substrate formed of a nanofiber web, the nanofiber web being formed of accumulated nanofibers and having pores, wherein the nanofibers are formed by electro spinning a first ion exchange solution;
   an electrically conductive film formed on both surfaces of the porous ion exchange substrate, the electrically conductive film being formed of a conductive material, a portion of which is penetrated into the pores of the porous ion exchange substrate, wherein the electrically conductive film is formed by depositing the conductive material; and
   a non-porous ion exchange membrane formed on a surface of one of the electrically conductive films, wherein the non-porous ion exchange membrane is formed by electrospraying a second ion exchange solution on the surface of the one of the electrically conductive films.

2. The deionization composite electrode of claim 1, wherein the porous ion exchange substrate includes a nonwoven fabric.

3. The deionization composite electrode of claim 1, further comprising a coat layer coated on a surface of the other one of the electrically conductive films.

4. The deionization composite electrode of claim 1, wherein the nanofibers have a diameter of 50 nm to 1500 nm.

5. The deionization composite electrode of claim 1, wherein the pores have a size of 0.1 μm to 10 μm.

6. A deionization apparatus comprising: a first deionization composite electrode and a second deionization composite electrode facing and spaced apart from the first deionization composite electrode, wherein each of the first deionization composite electrode and the second deionization composite electrode comprises a deionization composite electrode according to claim 1.

7. The deionization apparatus of claim 6, further comprising a spacer between the first deionization composite electrode and the second deionization composite electrode, wherein a flow path through which water to be treated passes is formed in the spacer.

8. The deionization apparatus of claim 7, wherein the first deionization composite electrode, the spacer, and the second deionization composite electrode are sequentially laminated and spirally rolled.

9. The deionization apparatus of claim 7, further comprising a filter module capable of filtering heavy metal ions and bacterial materials from purified water.

10. The deionization apparatus of claim 9, wherein the filter module comprises:

a silver (Ag) mesh module for removing the heavy metal ions from the purified water; and a nanofiber web fixed to the Ag mesh module thereby filtering the bacterial materials from the purified water from which the heavy metal ions have been removed.

11. The deionization apparatus of claim 10 wherein the filter module comprises a repeatedly laminated structure of the silver mesh module and the nanofiber web fixed to the Ag mesh module.

12. The deionization apparatus of claim 10, wherein the nanofiber web fixed to the Ag mesh module comprises a nanofiber web in which nanofibers containing silver nanomaterials are laminated.

* * * * *